United States Patent [19]

Rasmussen

[11] 4,132,860
[45] Jan. 2, 1979

[54] HOLD CONTROL FOR A KEY TELEPHONE SYSTEM

[75] Inventor: Harry R. Rasmussen, Tacoma, Wash.

[73] Assignee: Crest Industries, Inc., Puyallup, Wash.

[21] Appl. No.: 820,785

[22] Filed: Aug. 1, 1977

[51] Int. Cl.² .............................................. H04M 1/00
[52] U.S. Cl. ..................................... 179/99; 179/81 R
[58] Field of Search ...................... 179/99, 81 R, 18 F, 179/18 FA, 84 L, 81 C

[56] References Cited

U.S. PATENT DOCUMENTS

| | | | |
|---|---|---|---|
| 3,246,082 | 4/1966 | Levy | 179/99 |
| 3,870,831 | 3/1975 | McCarley | 179/99 |
| 3,906,168 | 9/1975 | McEowen | 179/99 |
| 3,909,554 | 9/1975 | Reed | 179/99 |
| 3,916,116 | 10/1975 | McEowen | 179/99 |

Primary Examiner—Kathleen H. Claffy
Assistant Examiner—Gerald L. Brigance
Attorney, Agent, or Firm—Christensen, O'Connor, Johnson & Kindness

[57] ABSTRACT

To convert a multiple line, multiple telephone set installation into a key telephone system, a control unit is provided at each telephone set. The control unit includes a regulated power supply, a control circuit, pushbutton line select and hold switches, and indicator lights packaged in a compact assembly which can be readily attached to the base of a standard telephone set or mounted separately. Electrically controlled switching devices within each control circuit respond to the pushbutton line select switches to couple the telephone set to a selected one of the lines and automatically disconnect the set from the line when the call has been completed. An incoming ringing signal on any one of the telephone lines is detected by the control circuit and the ringing signal is automatically applied to the bell of the telephone set. A line on which a call is in progress may be placed in a hold condition by operating the hold select button which thereafter enables the telephone set to be coupled to another line, if desired, for receiving or placing another call. A conference call can be established by simultaneously operating the two or more line select switches which in turn cause the selected lines to be jointly connected to the telephone set. The indicator lights on each control unit respond to standard central office supervisory signals which appear on the telephone lines and which represent on-hook (idle), ringing and off-hook (busy) line conditions, and also respond to a special hold indicating signal which is applied to the line by the control unit during the condition. The control units of the various telephone sets operate solely in conjunction with the standard telephone lines that extend from the central office and no additional interphone wiring is required and no central control unit is needed.

24 Claims, 4 Drawing Figures

HOLD CONTROL FOR A KEY TELEPHONE SYSTEM

BACKGROUND

In general the present invention relates to telephone station equipment, and more particularly to multiple telephone set installations serviced by multiple telephone lines from a central office. A related application, filed October 17, 1977 by Harry R. Rasmussen, Gene A. Kimzey and Robert D. Hailey for "KEY TELEPHONE SYSTEM", is pending as Serial No. 842,569.

Many telephone customers, especially businesses, need a telephone installation in which calls can be placed or received at any one of a number of telephone sets, and over any one of a plurality of available telephone lines from a central office. Such installations are in general available and are called key telephone systems (or KTS). One of the most commonly used systems of this type is intended for meeting the needs of customers that require a relatively large number of telephone lines, such as five or more lines, and for these customers the cost of the service is not unreasonable on a per line basis. However, there is a need for a less complex, lower cost key telephone system capable of efficiently meeting the needs of customers that have phone traffic requiring less than five lines but more than one line. For example, it is believed that there are many customers, in small businesses for example, that have a definite need for two line, key telephone service, but cannot justify the cost of such service because most available key telephone systems are cost efficient when used with five or more telephone lines.

One of the reasons for the prohibitively high cost of key telephone systems when used for two line installations is that the system includes a central control unit that must be set up and stored at a location remote from the telephone sets. The central control unit in turn involves a substantial installation cost, both for the control unit itself and also for the auxiliary wiring that must be strung between the control unit and each of the multiple telephone sets. Also, the telephone sets themselves must be specially made to accommodate the maximum number of key functions for which the system has been designed. For example, a standard KTS desk set may provide for five or more line select buttons, even though the customer is only using the system for two lines and thus only two of the available buttons are functional.

Although other telephone systems are available for providing a form of two line service on a relatively low cost basis, none of these existing two line systems have the capability or offer the convenience and flexibility of key telephone systems.

Accordingly, an overall object of the invention is to provide a novel key telephone system capable of being installed at a relatively low cost.

A more particular object of the invention is to provide a hold control for use in a key telephone system, that is capable of placing a line in a hold condition while a telephone set is temporarily disconnected from the line and, is capable of generating a hold indicating signal on the line for indicating to the other stations in the system that the line is on "hold". A related object is to provide such a hold control circuit in which the placing of the line in the hold condition, and the generating of the hold indicating signal on the line do not interfere with the normal supervisory signalling between the central office and the telephone sets.

Still another object of the invention is to provide such a hold control which has the further characteristic of providing reliable and consistent operation in key telephone systems installed at widely varying line distances from the central office.

SUMMARY

The hold control circuit of the invention is intended for use in a key telephone system having at least two telephone lines that extend between a central office and two or more telephone stations. Each telephone station is equipped with a telephone set, which may be a standard set intended for a single line installation. A plurality of control units are provided, one at each of the telephone stations. The telephone lines are connected to separate inputs provided on each control unit at each station so that telephone calls can be received or initiated over any one of the multiple lines using the telephone set at that station. Each control unit includes at least one hold control circuit of the invention which is responsive to a manually-actuated hold select switch, and provides for establishing a hold condition on one of the lines over which a telephonic connection has been made through the central office. For this purpose, the hold control circuit comprises means for connecting a line terminating impedance across the line that is to be held and concurrently applying a hold condition indicating signal onto such line by periodically varying such line terminating impedance. The line terminating impedance establishes an impedance condition on the line that is interpreted by the central office as an off-hook condition and thus in effect simulates an off-hook condition which causes the central office to maintain the connection with the remote party. The periodic variation of the line terminating impedance produces a fluctuating voltage across the line which is communicated to the other control units, over the telephone line itself, to indicate that the line is on hold. Visual indicating means at each control unit respond to the hold indicating signal by producing a visual display at the respective telephone station, indicating that the applicable line is in a hold condition, awaiting to be picked up at any one of the available stations. The hold condition is automatically terminated when the held line assumes an actual off-hook condition indicating that one of the stations has picked up the line.

In the preferred form of the hold control circuit, the line terminating impedance is associated with a circuit means for periodically shunting a portion of such terminating impedance so as to cause the effective impedance that appears across the line to fluctuate and thereby produce the fluctuating voltage which serves as the hold indicating signal.

The line terminating impedance is preferrably provided by one or more serially connected voltage breakdown devices, such as zener diodes, so that the voltage drop developed across the terminating impedance or impedances is independent of variations in loop resistance due to differences in the loop length and conductor size and type.

These and further features, objects and advantages of the invention will become apparent to those skilled in the art from the following detailed description and appended drawings.

DETAILED DESCRIPTION

Figure 1:
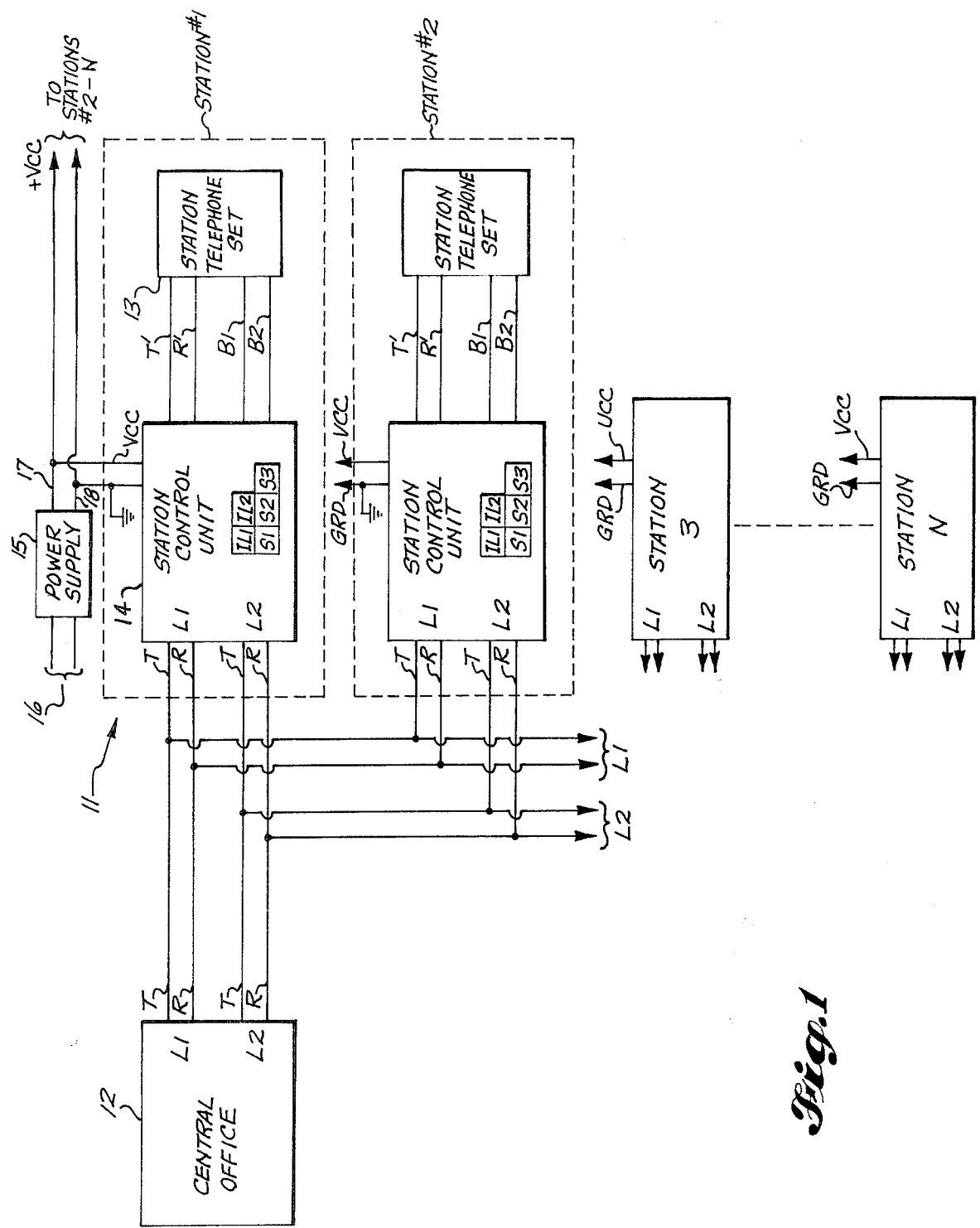
FIG. 1 is a generalized block diagram of the key telephone system of the invention.

The key telephone system (KTS) 11 in which the invention is used is shown in FIG. 1 for a two line installation. First and second telephone lines, L1 and L2, extend from a central office 12 to a customer's installation which includes KTS 11. Lines L1 and L2 are standard, two conductor lines, each including a tip and a ring conductor, which carry both central office supervisory signals and telephonic voice signals between central office 12 and a customer's telephone set, installed at his business or residence.

KTS 11 encompasses a plurality of telephone stations #1–N, each of which is equipped with a telephone station set and a KTS control unit, such as illustrated by telephone set 13 and control unit 14 for station #1. Low voltage DC power is supplied to control unit 14 of station #1 and to the corresponding control units of the remaining stations #2–N by means of either a common power supply 15 as shown in FIG. 1, or by a plurality of individual power supplies, one for each station. The illustrated power supply 15 operates from a source of dc at 8–16 volts which is applied to input 16. At the output of supply 15 a low supply voltage +Vcc appears on line 17, while line 18 is reference ground.

Each of the control units, such as unit 14 for station 1, includes a control circuit (FIGS. 2 and 3), a set of line select switches S1 and S2 (one for each of lines L1 and L2), a hold select switch S3, and a set of line condition indicator lights IL1 and IL2 (one for each of lines L1 and L2). Switches S1, S2 and S3 are pushbutton switches of the momentary contact type. Switches S1 and S2, when separately depressed, cause the associated one of lines L1 and L2 to be coupled to the telephone set 13. Switch S3, when depressed, places the line over which a telephonic communication has been established in a hold condition. Indicator lights IL1 and IL2 at each control unit visually display the instantaneous condition of the associated line. The various telephone line conditions are: on-hook (sometimes called idle), off-hook (sometimes called busy), holding, and ringing.

Each of lines L1 and L2 includes a tip conductor indicated by a T and a ring conductor indicated by an R. The tip and ring conductors of lines L1 and L2 are connected in parallel to the control units of all of the available stations #1–N. Thus, as illustrated in FIG. 1, each station receives as inputs, to the station control unit, the tip and ring conductors of every one of the available lines from central office 12.

The outputs of each control unit 14 include common output tip and ring conductors, designated as T' and R', respectively, which are connected to the tip and ring terminals of the station's telephone set 13. Output tip and ring conductors T' and R' are selectively connected to the tip and ring conductors of either one or both of lines L1 and L2 by the station control unit 14 as described more fully below. The outputs of each station control unit 14 also include a pair of bell ringing conductors represented as B1 and B2. Conductors B1 and B2 extend from the control unit 14 to the station's telephone set 13 and provide for energizing the bell or other audible signalling device in the telephone set in response to a ringing signal on either of lines L1 and L2.

The telephone set 13 at each of the stations may be a standard single line telephone set. For example, a type 500 set (conventional dialing) or a type 2500 set (Touch-Tone dialing — A service mark of AT&T) are suitable.

The circuitry, indicator lights and selector switches for each control unit 14 are constructed and assembled so as to form a small, compact unit that can be mounted directly to the case of the telephone set 13. Alternatively, the control unit may be packaged in a housing mounted adjacent to but separate from the telephone set. The former packaging and mounting of switches, S1, S2, S3, indicator lights IL1 and IL2, and the associated circuitry are described in copending patent application, Ser. No. 713,870 for CONTROL UNIT MOUNTING AND INTERCONNECTING APPARATUS FOR TELEPHONE SETS, filed Aug. 12, 1976 by Harry R. Rasmussen, and issued on Dec. 6, 1977 as patent No. 4,061,888.

STATION CONTROL UNIT

Figure 2:
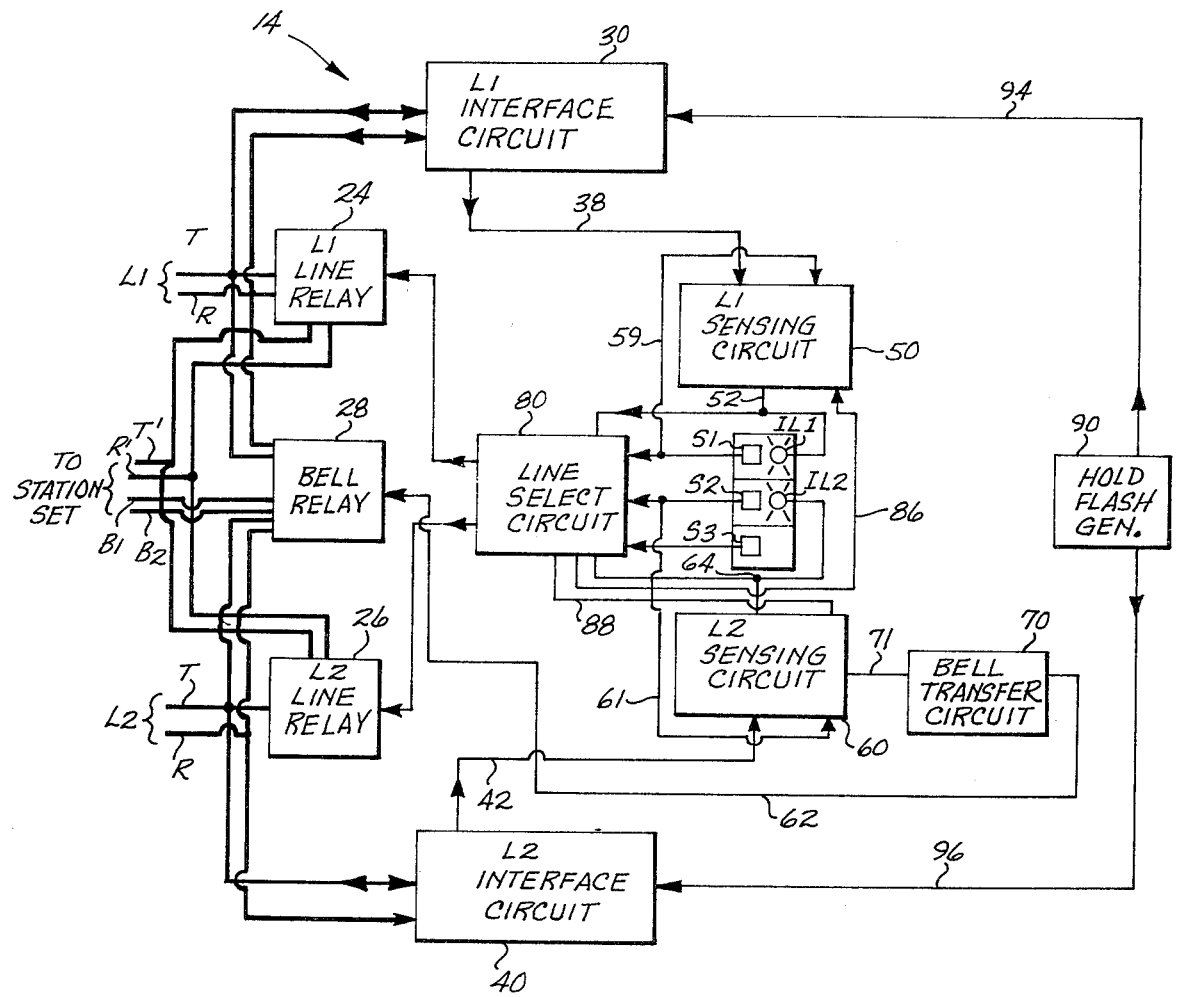
FIG. 2 is a more detailed block diagram of one of the plurality of control units that is provided at each telephone station in the system of FIG. 1.

The control units for stations #1–N are identical, and thus only one control unit, namely unit 14, will be shown and described in detail. With reference to FIG. 2, control unit 14 includes a set of line relays 24 and 26 that serve as switching devices for selectively connecting the tip (T) and ring (R) conductors of lines L1 and L2 to the common output tip (T') and ring (R') conductors which extend to the telephone set 13.

A bell relay 28 is also connected to the tip and ring conductors of L1 and L2 and serves as a switching device for selectively connecting a ringing signal of an incoming call, whether on line L1 or L2, to the common bell ringing conductors B1 and B2.

Lines L1 and L2 are also separately and respectively connected to an L1 interface circuit 30 and an L2 interface circuit 40. Circuits 30 and 40 include electro-optical isolating devices that enable lines L1 and L2 to be coupled to line condition sensing circuitry and hold signal generating circuitry of control unit 14 without direct connection of such circuitry to the telephone lines.

Similarly, separate sensing circuits 50 and 60 are provided, one for each of lines L1 and L2. Sensing circuit 50 is connected to interface circuit 30 by means of connection 38 to receive signals developed by interface circuit 30 that indicate the operating condition, whether on-hook, off-hook, holding or ringing, of line L1. Sensing circuit 50 discriminates between the various signal conditions and develops certain control signals that govern the operation of other circuitry in control unit 14. Sensing circuit 60 is coupled to interface circuit 40 over connection 42 and functions in the same manner as sensing circuit 50 except circuit 60 receives and interprets the line condition signals appearing on L2.

Indicator lights IL1 and IL2 are connected to outputs 52 and 64 of sensing circuits 50 and 60, respectively, for visually displaying the operating condition of the respective lines as sensed by circuits 30 and 40. The indicator lights IL1 and IL2 operate independently, each displaying the instantaneous operating condition of the associated one of lines L1 and L2.

A line select circuit 80 of control unit 14 is responsive to outputs 52 and 64 of sensing circuits 40 and 60 and to line select switches S1 and S2 and to hold select switch S3 for controlling the operation of line relays 24 and 26. Also, circuit 80 coordinates the operation of line relays 24 and 26 for automatically dropping one of the lines when the other line is to be picked up at the same station, and for concurrently operating both relays 24 and 26 when a three-point conference call is to be established as more fully described below.

The hold control circuitry is distributed among circuits 30, 40, 50, 60 and 80. The hold condition is initiated by depressing switch S3 which causes line select circuit 80 to produce control signals on lines 86 and 88 which in turn cause sensing circuits 50 and 60 and interface circuits 30 and 40 to latch one of lines L1 and L2 in a hold condition. Connections 59 and 61 between S1, S2 and circuits 50, 60, respectively, insure that only the line then connected to the telephone set, is placed on hold in response to actuation of the single hold select switch S3.

During a hold condition on either one of lines L1 or L2, the associated interface circuit 30 or 40 places a line terminating impedance across the applicable line so as to simulate the internal impedance of a telephone set and thereby cause the central office to hold the line in communication with the remote party. At the same time that the line terminating impedance is connected across the line, a hold indicating signal is applied to the line over connections 94 and 96 in response to a flash generator 90.

A bell transfer circuit 70 having a connection 71 to sensing circuit 60 operates bell relay 28 in a manner that will be described more fully below to insure that the ringing signal is applied to the bell of the station's telephone set regardless of which line receives an incoming call.

Figure 3:
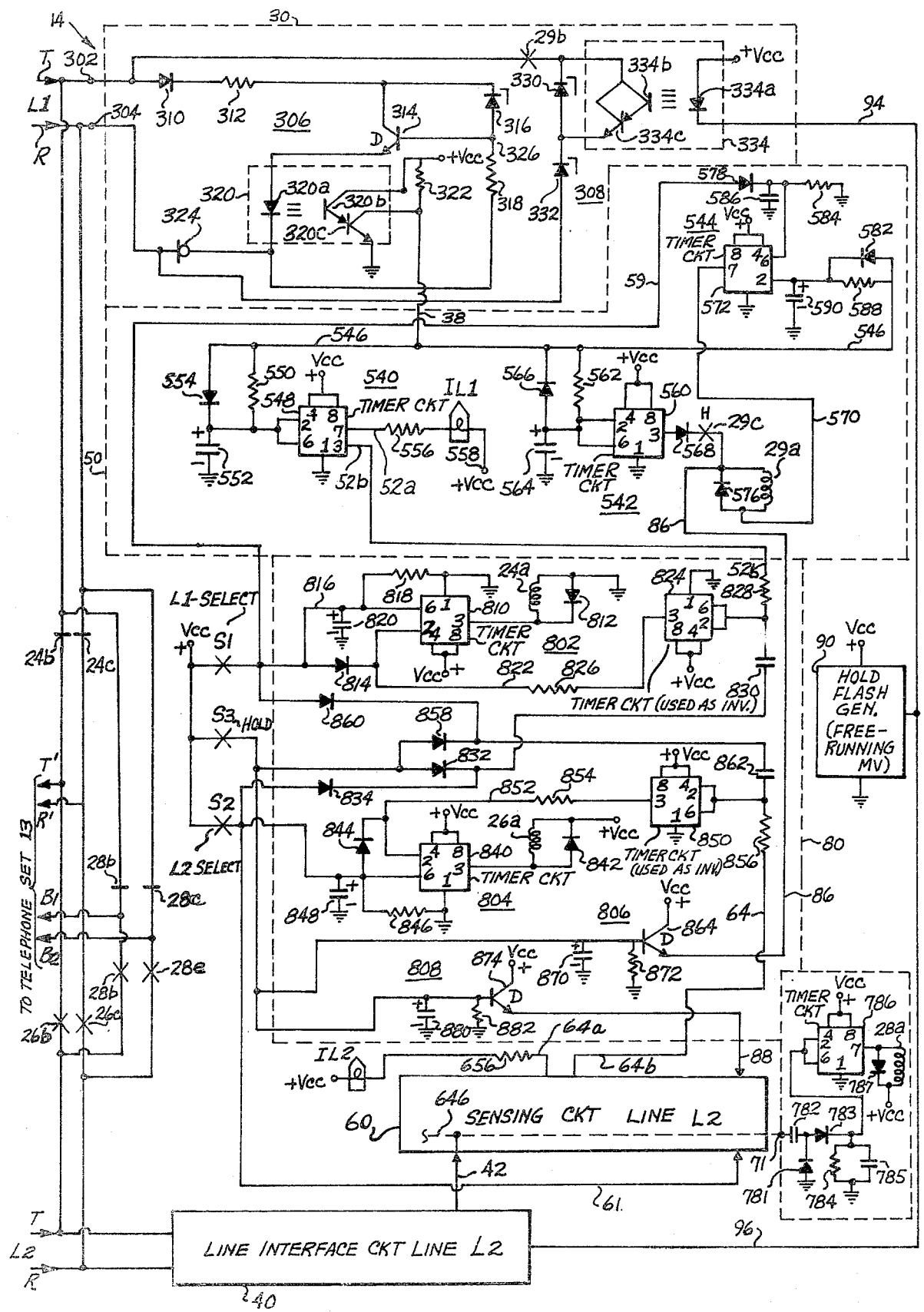
FIG. 3 is a detailed block and schematic diagram of the control unit shown in FIG. 2 in accordance with one preferred embodiment of the invention.

With reference to FIG. 3, the circuit elements of control unit 14 and in particular, the elements of the hold control circuitry of the present invention, are described in greater detail as follows.

LINE RELAYS

Line relays 24 and 26 include separate relay coils 24a and 26a schematically located within the dotted line that circumscribes line select circuit 80 (FIG. 3). A set of normally closed relay contacts 24b and 24c of relay 24 connect the tip and ring conductors of line L1 to the output tip and ring T' and R' of control unit 14. Although contacts 24b and 24c of relay 24 are normally closed, the coil 24a is normally energized as will be described more fully herein so that functionally, contacts 24b and 24c are normally open and are closed only when coil 24a is selectively deenergized in order to couple line L1 to T' and R' and thus to the telephone set 13 (FIG. 1).

Relay 26 includes a set of normally open contacts 26b and 26c separately connected in series between the tip and ring conductors of line L2 and the output tip and ring conductors T' and R'. Unlike relay 24, the coil 26a of relay 26 is normally unenergized and is selectively energized by circuit 46 when line L2 is to be connected to T' and R' and thus to the telephone set 13. The connection and operation of relays 24 and 26 in this manner insures that at least one telephone line will be connected to the telephone set 13 in the event of a power failure. In such case both relay coils 24a and 24b will be forced to their deenergized state and line L1 will in that case be connected to the telephone set 13 through contacts 24b and 24c.

BELL TRANSFER RELAY AND CIRCUIT

Bell transfer relay 28 includes a relay coil 28a located in bell transfer circuit 70 (FIG. 3) for selectively operating two sets of contacts including a normally closed set of contacts 28b and 28c, and a normally open set of contacts 28d and 28e. Contacts 28b and 28c are separately and serially connected between the tip and ring conductors of line L1 and the output bell ringing conductors B1 and B2 which extend to the bell ringing device of the telephone set 13. Similarly, normally open contacts 28b and 28e are separately serially connected between the tip and ring conductors of line L2 and the output bell ringing conductors B1 and B2. An incoming ringing signal on line L1 will automatically appear on output conductors B1 and B2 to cause the telephone set 13 at station 14 to ring.

Bell transfer circuit 70 includes an input 71 connected to the L2 sensing circuit 60, a DC blocking capacitor 782 serially connected between input 71 and the junction of the anode of a blocking diode 783 and the cathode of a clamping diode 781. The anode of diode 781 is connected to ground and the cathode of diode 783 is connected through a parallel RC network of resistor 784 and capacitor 785 to ground. The cathode of diode 783 is also connected to pins 2 and 6 of a linear integrated circuit 786 (described below). The output of circuit 786 is provided at pin 7 and is connected through coil 28a to +Vcc and a diode 787 is connected in shunt around coil 28a.

Circuit 786 is a commercially available device manufactured and sold by a number of companies including National Semiconductor Corporation of Santa Clara, Calif., and Raytheon Corporation of Boston, Mass., and is commonly designated in the electronic industry as a 555 timer. It is a multipurpose timer circuit that can be adapted for performing a wide variety of timing and control functions depending upon the external circuitry to which it is connected. The operational characteristics of the 555 timer, in general, and its particular use as circuit 786 are described below. The particular functioning of the other 555 timer circuits, used throughout control unit 14, will be covered hereinafter.

Supply voltage for the 555 timer is applied between pin 1 and pin 8, with pin 1 being tied to ground and pin 8 to +Vcc. The active inputs and outputs of the timer, as used in the circuitry disclosed herein, are: a first output pin 3, a second output pin 7 (which is operationally similar to pin 3), a first input pin 2 and a second input pin 6. A reset input pin 4 is also shown (connected to +Vcc) but the reset function is not used in the present circuitry and the connection to +Vcc is merely to prevent false triggering of the reset function.

Details of construction and operation of 555 timer are available from the above-mentioned manufacturers. For the present disclosure, a brief, generalized description of the construction of the 555 timer will suffice. It is comprised of first and second comparator stages, a bistable flip-flop stage and a voltage divider impedance network. The voltage divider impedance network is connected between pin 8 and ground and thus serves to divide the supply voltage +Vcc into predetermined fractions, namely $\frac{1}{3}$ +Vcc and $\frac{2}{3}$ +Vcc. The first and second comparators are each connected to compare the input voltage applied to an associated one of the first and second input pins 2 and 6, respectively, with the fractional $\frac{1}{3}$ and $\frac{2}{3}$ +Vcc voltage levels developed by the divider network. The input impedances at the input pins 2 and 6 are characteristically very high. The outputs of the first and second comparators are connected so as to set and reset, respectively, the flip-flop stage. The flip-flop stage is normally reset and in this state output pin 3 is high (at or near +Vcc) and output pin 7 is an open circuit. Pin 7 is connected to the collector of a transistor which has its emitter grounded, and is switched between a nonconducting state (when the flip-flop stage is reset) and a conducting state (when the flip-flop stage is set).

When the input voltage at pin 2 rises above $\frac{1}{3}$ +Vcc, the output of the first comparator enables the flip-flop stage to be switched to its set state, but only after the input voltage at pin 6 subsequently rises to $\frac{2}{3}$ +Vcc. The flip-flop stage will remain in the set state until both the voltage at pin 2 drops below $\frac{1}{3}$ +Vcc and the voltage at pin 6 drops below $\frac{2}{3}$ +Vcc. Unless both these voltage conditions are met, the flip-flop stage will remain in its set state. In the set state, output pin 3 is low (grounded) and output pin 7 is also low (grounded through the collector-emitter path of the above-mentioned transistor which has now been switched to its conducting state). The required concurrence of voltage conditions at input pins 2 and 6 provides the 555 timer with an electronic AND logic function.

Once the flip-flop stage is in its set state, it may be latched in such state by maintaining the voltage at either one of pins 2 and 6 above its threshold switching level, respectively, $\frac{1}{3}$ +Vcc and $\frac{2}{3}$ +Vcc, even though the voltage at the remaining input pin goes low. Thus the 555 timer has the capability of performing as an electronic latch.

Additionally, the input pins 2 and 6 are adapted to be connected to external resistive-capacitive delay networks in a manner that conditions the 555 timer to function as a timing circuit. The timing intervals of the circuit are determined by the values of the externally connected resistive and capacitive elements. When used as a timing circuit input pins 2 and 6 may be connected together to receive a common input voltage, or they may be connected separately in order to tailor the timing function to each particular application.

In still another use of the 555 timer, it may be operated as an inverter. In such case, the input pins 2 and 6 are tied together for receiving an input voltage. Output pin 3 swings high when the voltage at input pins 2 and 6 is low (below $\frac{1}{3}$ +Vcc) and output pin 3 swings low when the voltage at input pins 2 and 6 is high (above $\frac{2}{3}$ +Vcc).

Accordingly, it will be appreciated that the 555 timer is a versatile, integrated cicuit capable of being connected so as to provide one or more of the functions of an AND logic circuit, a latching circuit, a timing circuit and an inverting circuit. Because its most common use is for timing, it is usually called a timer circuit and is referred to as such herein.

For the purpose of illustrating control unit 14, timer circuit 786 and other identical integrated circuits used throughout the control unit are shown as a single integrated circuit unit known by the designation 555. In the actual manufacture of control unit 14, it has been found preferable to use a dual integrated timer circuit known in the industry as a 556 which packages two integrated circuits, each of which is functionally identical to a 555 timer, into a single integrated component.

The 555 timer used for circuit 786 has its input pins 2 and 6 tied together to respond to the voltage across the RC network of resistor 784 and capacitor 785. As the voltage at pin 2 rises from ground potential in response to a ringing signal detected by sensing circuit 60 as described herein, pin 2 becomes enabled at $\frac{1}{3}$ +Vcc and thereafter the flip-flop stage of circuit 786 switches when pin 6 reaches $\frac{2}{3}$ +Vcc. The output pin 7 thereupon switches to ground and causes relay coil 28a to be energized. When the voltage at pins 2 and 6 starts to drop from +Vcc toward ground, circuit 786 does not switch until the voltage at pin 2 falls below $\frac{1}{3}$ +Vcc. The RC network of resistor 784 and capacitor 785 hold the voltage at pin 2 above $\frac{1}{3}$ +Vcc during the silent intervals of a ringing signal and thereby maintain relay coil 28a energized from one burst of AC ringing to the next.

LINE INTERFACE CIRCUITS (Including the Line Terminating Impedance and the Hold Signal Generator of the Hold Control Circuitry)

Line interface circuits 30 and 40 are identical and therefore only circuit 30 for line 1 will be described in detail. The tip and ring conductors of line L1 are connected directly to input terminals 302 and 304 so that the signal condition on line L1 is continuously applied to circuit 30. The positive side of the tip and ring conductors (usually tip is positive) is connected to terminal 302 since circuit 30 is polarity sensitive. Alternatively, a full-wave rectification bridge may be connected and poled between the tip and ring conductors and input terminals 302 and 304 to insure a proper application of polarity to the input of circuit 30 regardless of the tip and ring polarity. Connected across input terminals 302 and 304 is a first network 306 including an electro-optical isolator that detects the voltage on L1 without interfering with the normal communication of signals between the telephone set and the central office. Connected in parallel with network 306 across input terminals 302 and 304 is a second network 308, constructed in accordance with the present invention, that functions during the hold condition to apply a line terminating impedance across L1 (that simulates an off-hook condition) and at the same time apply a hold indicating signal across line L1, again without interfering with the normal signalling between the telephone line and its associated central office.

Network 306 includes a diode 310, a low impedance resistor 312 of 430 ohms, integrated Darlington paired transistors 314 (although only one transistor symbol is shown, the accompanying letter "D" designates the fact that two Darlington connected transistors are used in an integrated package), a zener diode 316, a base bias resistor 318 of 470 K ohms, an integrated electro-optical isolator 320, another resistor 322 of 2.2 K ohms and a current limiting diode 324. Diode 310 and resistor 312 are connected in series to pass positive current from the tip conductor of line L1 to a junction between the collectors of Darlington transistors 314 and the cathode of zener diode 316. Resistor 312 is of relatively low value so as to enable zener diode 316 to respond to the line voltage. Diode 324 limits the amount of current flowing in the circuit loop formed by the connection of network 306 across the terminals 302 and 304 to a preselected maximum current. In this embodiment, diode 324 limits the current to 0.5 milliamperes to prevent excessive current drain on the central office voltage source that supplies line L1.

Darlington transistors 314, zener diode 316, electro-optical isolator 320 and the associated resistors 318 and 322 serve to sense the voltage on line L1 and cause an output signal to be produced on output connection 38 that reflects the instantaneous signal condition on line L1. For this purpose the collector emitter paths of Darlington transistors 314 are connected in series with a light emitting diode 320a of isolator 320 so that when the Darlington transistors 314 are conducting, diode 320a is energized and emits light that impinges on the input base electrode of Darlington paired phototransistors 320b and 320c of isolator 320. The emitter of transistor 320c is connected to ground and its collector is connected to the junction between output connection 38 and resistor 322. The collector of transistor 320b is connected to +Vcc and to the opposite end of resistor 322 from the collector of transistor 320c. When transistors 320b and 320c are conducting as a result of the light emitted by diode 320a, transistor 320c clamps the voltage on connection 38 to ground, and when these transistors are nonconducting as a result of diode 320a being unenergized, then the potential on connection 38 rises to +Vcc. Thus, for an on-hook condition, the voltage on connection 38 is low and for on off-hook condition it is high.

Switching of isolator 320 is controlled by Darlington transistors 314 in response to the voltage at a junction 326 between the anode of zener diode 316 and resistor 318, which voltage is in turn responsive to the voltage condition appearing across the tip and ring conductors of line L1.

As described more fully below, the voltage across line L1 changes significantly between on-hook and off-hook conditions. This change in voltage together with a careful selection of the break-down voltage for zener diode 316, serve to cause the voltage at junction 326 to change in an abrupt, discrete manner as the line voltage swings between the on-hook and off-hook values. The discrete change in voltage at junction 326 serves to bias Darlington transistors 314 on when L1 is in an on-hook condition, and to bias the Darlington transistors 314 off when L1 is in an off-hook condition. A ringing signal on line L1, after rectification by diode 310, also causes on/off switching of Darlington transistors 314 in synchronization with each burst of ac ringing.

The breakdown voltage for zener diode 316 should be within the range of 15-20 volts, and a breakdown voltage of 15 volts is preferred. When the line voltage across the tip and ring conductors of L1 is below 15 volts, reflecting an off-hook condition on the line, then zener diode 316 has a very high impedance relative to resistors 312 and 318 and thus the entire line voltage is dropped across diode 316. Under these conditions, the input base of Darlington transistors 314 is essentially at the same potential as the output emitter of transistors 314 and therefore Darlington transistors 314 are biased off. When the line voltage rises above the 15 volts break-down voltage of diode 316, reflecting an on-hook condition, the excess voltage is dropped across resistor 318. The voltage drop across resistor 318 causes the input base of transistors 314 to swing to a positive potential and turn transistors 314 on.

Network 308 is selectively connected to the input terminals 302 and 304 by a hold control relay 29 that includes a relay coil 29a and a set of normally open relay contacts 29b. Coil 29a of the hold relay is schematically located within the dotted line that circumscribes sensing circuit 34, while the normally open contacts 29b are shown in circuit 30 and are connected in series between input terminal 302 and network 308.

Network 308 includes a set of serially-connected, like-poled zener diodes 330 and 332 with the cathode of diode 330 disposed for connection to terminal 302 through normally open hold relay contacts 29b and the anode of diode 332 connected to terminal 304. Connected in shunt across diode 330 is the transistor output stage of another photo-optical isolator 334. In particular, isolator 334 includes a light emitting diode 334a having its anode connected to +Vcc and its cathode joined to connection 94 that extends to flash generator 90. Light produced by diode 334a when energized impinges on the base electrode of one of a pair of Darlington paired phototransistors 334b and 334c. In the absence of light from diode 334a, the collector-emitter paths through transistors 334b and 334c are at a high impedance such that a virtual open circuit appears across zener diode 330. When light is produced by diode 334a in response to a signal from flash generator 90 over connector 94, transistors 334b and 334c conduct providing a short circuit path in shunt around zener diode 330.

As described more fully below, the serially connected zener diodes 330 and 332 when connected across line L1 by means of contacts 29b, cause a predetermined, zener-regulated voltage to be presented across the tip and ring conductors of line L1 so as to simulate the connection of the internal impedance of a telephone set across the telephone line as occurs when the telephone set is off-hook. The switching of photo-transistors 334b and 334c by diode 334a when zener diodes 330 and 332 are connected across line L1 causes the upper zener diode 330 to be periodically shunted in synchronization with the pulsating signal developed by generator 90. Thus the voltage of line L1 due to the combination of the serially connected zener diodes 330 and 332 fluctuates between the sum of the break-down voltages of both zener diodes (when the phototransistors of isolator 334 are nonconducting), and the voltage due solely to the lower zener diode 332 (when the phototransistors of isolator 334 are conducting).

The values of zener diodes 330 and 332 are carefully selected in accordance with the following design constraints. The voltage fluctuation appearing across the tip and ring conductors of line L1 caused by the periodic shunting of zener diode 330 by generator 90 must be sufficient to produce a hold indicating signal having sufficient amplitude to enable reliable response by the sensing circuits of the other control units in KTS 11. Secondly, the combined break-down voltages of zener diodes 330 and 332 which occurs when diode 330 is unshunted, must be sufficiently low so as to enable a minimum loop current to flow in the telepone line. The minimum loop current is needed to maintain the connection at central office to the remote party. A combined break-down voltage of approximately 20 volts meets this constraint, and will cause, a minimum of 20 milliamperes to flow in the line. Also, when diode 330 is shunted, a minimum residual voltage should be maintained across the line, and this is provided by selecting zener diode 332 to have a breakdown voltage of approximately 5 volts. The resulting voltage swing of 15 volts across the tip and ring conductors of the line during the hold flesh condition has been found adequate as a reliable hold indicating signal.

SENSING CIRCUIT

Except for the difference described immediately below, sensing circuits 50 and 60 are identical and thus only circuit 50 will be described in detail. The one difference that does exist is the provision of bell transfer circuit 70 in association with sensing circuit 60. Only one bell transfer circuit is used and in this instance it cooperates with sensing circuit 60 in a manner that is described more fully below.

Now with reference to FIG. 3, sensing circuit 50 is composed of a line select enable control and indicator light driver network 540, a hold latching network 542 and a hold enable network 544. All three of these networks are jointly connected to a control signal bus 546 which in turn is connected to output connection 38 from line interface circuit 30.

Network 540 responds to the signal condition on line L1 as represented by the signal on output connection 38 and, when an off-hook condition appears on telephone line L1, network 540 enables line select circuit 80 to respond to actuation of line select switch S1 to thereby operate line relay 29. For this purpose, network 540 includes a timer circuit 548 that is identical to the above-described circuit 786. Input pins 2 and 6 of circuit 548 are connected through a nonlinear RC delay network including resistor 550, capacitor 552 and diode 554 to bus 546. Resistor 550 has a value of 150 K ohms and capacitor 552 has a value of 1.0 microfarad and together they form an RC delay network that prevents the response of network 540 to dial pulses appearing on line L1 after line L1 has gone off-hook. Diode 554 connected in shunt across resistor 550 allows circuit 548 to respond immediately to an off-hook signal on line L1, but delays the response at pins 2 and 6 of circuit 548 to the low going pulses on bus 546 caused by the dialing pulses on L1 so that circuit 548 remains in a switched condition during the dialing phase following an off-hook signal on line L1.

The output of circuit 548 at pin 7 is joined to connection 52a for energizing indicator light IL1, and the output of pin 3 is joined to connection 52b for applying a line select enable signal to line select circuit 80. In particular, connection 52a extends through a serial connection of resistor 556 and indicator light IL1 to a terminal 558 to which +Vcc is applied. Indicator light IL1 is energized when the output at pin 7 of circuit 548 is clamped to a ground potential in response to the signal applied at input pins 2 and 6. The function of output 52b at pin 3 is described below.

Network 542 is made up of another timer circuit 560 identical to circuit 786, and having a first and second input pins 2 and 6 connected to a nonlinear RC delay network including resistor 562 having a value of 470 K ohms capacitor 564 of 1 microfarad and a diode 566. Input pins 2 and 6 of circuit 560 are connected to a junction between a resistor 562 and a capacitor 564 which are in turn respectively connected at their opposite ends to bus 546 and to ground. Circuit 560 responds to the voltage at the junction between resistor 562 and capacitor 564 and switches when such voltage rises to $\frac{2}{3}$ +Vcc as bus 546 swings high. Diode 566 is connected in shunt about resistor 562 and becomes forward biased so as to short circuit the resistive portion of the RC network and rapidly discharge capacitor 564 when the voltage on bus 546 swings low and drops below $\frac{1}{3}$ +Vcc. When the voltage on bus 546 swings high, diode 566 is reverse biased and restores the delaying effect of resistor 562 and capacitor 564 causing a time delay in the response of circuit 560. As described more fully herein, this time delay operates to maintain hold relay 29 energized during the application of the hold indicating signal to L1 by network 308 and to deenergize the hold relay 29 when L1 goes to an off-hook condition.

The output of circuit 560 is taken from pin 3 which is serially connected through a blocking diode 568 and through normally open latching contacts 29c of hold relay 29 and thence to one side of hold relay coil 29a. The opposite side of coil 29a is joined over connection 570 to the output pin 7 of still another timer circuit 572 of hold enable network 544. Additionally, connection 86 from line select circuit 80 is joined to the junction of hold contacts 29c and coil 29a. A current surge limiting diode 576 is connected in shunt about coil 29a.

As described more fully hereinafter, coil 29a is initially energized over connection 86 from circuit 80 and is thereafter latched in an energized state during the hold condition through a latching circuit including hold relay contacts 29c, diode 568 and circuit 560. The connection 570 to circuit 572 functions to enable the energization of hold relay coil 29a only under certain operating conditions of network 544, which are described below.

Hold enable network 544 includes, in addition to linear integrated circuit 572, a nonlinear RC input circuit composed of diode 578, resistor 584 and capacitor 586, and a second nonlinear RC network of diode 582 and resistor 588 and capacitor 590. The RC network of resistor 584 and capacitor 586 is joined to connection 59 from line select switch S1 through blocking diode 578 and thence to input pin 6 of circuit 572. Bus 546 is connected to pin 2 of circuit 572 via the RC network of resistor 588 and capacitor 590, while diode 582 is connected in shunt about resistor 588 to selectively short circuit the resistor when bus 546 is positive with respect to the voltage at pin 2.

Capacitor 586 is charged through diode 578 to maintain +Vcc at pin 6 for a predetermined interval after release of S1. The interval is set by the time constant of resistor 584, being 1 megohm, and capacitor 586, being 1 microfarad. Before capacitor 586 discharges, line relay 24 is operated and control signal bus 546 goes to +Vcc in response to L1 going off-hook. The +Vcc on bus 546 is applied to pin 2 of circuit 572 through diode 582 which, in accordance with the latching feature of circuit 572 damps output pin 7 of the circuit at ground potential even though the voltage at input pin 6 thereafter goes low as capacitor 586 discharges through resistor 584. The RC network of resistor 588 of 100 K ohms and capacitor 590 of 10 microfarad maintains the voltage at pin 2 high to hold the output pin 7 of circuit 572 at ground potential for a predetermined time after bus 546 goes low so as to continue the hold enable during the hold condition when bus 546 is fluctuating between +Vcc and ground. When the hold condition is terminated as described herein and thereafter line L1 goes back on hook, then circuit 572 reverts to its normal state causing output pin 7 to assume an open circuit condition.

LINE SELECT CIRCUIT

As shown in FIG. 3, line select circuit 80 includes a line relay switching network 802 for operating coil 24a of relay 24 which in turn controls contacts 24b, 24c that connect L1 to the telephone set. Another line relay switching network 804 operates coil 26a of relay 26 which has contacts 26b, 26c that connect L2 to the telephone set. Additionally, circuit 80 includes first and second hold initiate transistor networks 806 and 808 connected between hold select switch S3 and connections 86 and 88, respectively that extend to sensing circuits 50 and 60.

Network 802 includes a time circuit 810, identical to circuit 786 described above. Output pin 3 of circuit 786 is connected to one end of coil 24a of relay 24. The opposite end of coil 24a is grounded and a surge-current suppressing diode 812 is connected in shunt about coil 24a. As briefly described above, coil 24a is normally energized so as to maintain the set of normally closed contacts 24b and 24c in an open condition, closing these contacts only when L1 is to be connected to the telephone set associated with control unit 14. Thus, output pin 3 of circuit 810 is normally at +Vcc to energize coil 24a and switches low when the voltages at inputs pins 2 and 6 swing toward +Vcc.

A diode 814 is serially connected between L1 select switch S1 and pin 2 of circuit 810 and is poled to apply +Vcc to pin 2 when S1 is depressed to close the normally open contacts thereof. An RC delay network of resistor 818 of 10 K ohms and capacitor 820 of 10.0 microfarads is joined to connection 816 to maintain pin 6 high for approximately 100 milliseconds after S1 is released to allow time for circuit 810 to be latched by a signal applied to pin 2 over a connection 822 as described below.

Network 802 includes an additional timer circuit 824, identical to circuit 786, best in this case connected to function as a polarity inverter. Output pin 3 of circuit 824 is coupled to pin 2 of circuit 810 through a 100 K ohm resistor 826 serially joined to connection 822. Circuit 824 has its input pins 2 and 6 jointly connected through a 100 K ohm input resistor 828 to connection 52b from sense circuit 50 to maintain these input pins at +Vcc so long as L1 is on-hook and to drive these pins to ground potential when L1 goes off-hook. As a result, the voltage at pin 3 of circuit 824 is the inverse of the voltage at the input pins and is normally at ground potential and swings to +Vcc when L1 goes off-hook.

Input pins 2 and 6 of circuit 824 are also connected through a coupling capacitor 830 to the cathodes of a pair of diodes 832 and 834. The anode of diode 832 is connected to the normally open contacts of hold select switch S3 which as described more fully herein causes circuits 824 and 810 to energize coil 24a and thereby disconnect L1 from the telephone set when S3 is depressed. The anode of diode 834 is connected to L2 select switch S2 and also causes circuits 824 and 810 to energize relay coil 24a when S2 is depressed. Momentary closure of S2 or S3 causes a positive voltage spike to be applied to pins 2 and 6 of circuit 824 through diodes 834 or 832, respectively, and through coupling capacitor 830, causing the output pin 3 to swing high thereby cancelling a latching signal that otherwise holds pin 2 of circuit 810 high, allowing circuit 810 to revert to its normal, unswitched condition, and causing relay coil 24a to be energized.

Line relay switching network 804 is similar to network 802 except that coil 26a of L2 line relay 26 is connected between pin 3 of a timer circuit 840 and +Vcc so that coil 26a is normally unenergized as described above and is energized to close normally open contacts 26b and 26c only when L2 is to be connected to the telephone set 13. The remaining components of network 804 are identical to network 802. Thus a current-suppressing diode 842 is connected in shunt about coil 26a. A diode 844 is connected between S2 and input pin 2 of circuit 840 while S2 is connected directly to pin 6 of circuit 840 and is also connected to an RC delay network including resistor 846 and 848. An additional timer circuit 850 corresponding to circuit 824 of network 802 and connected to function as an inverter, has its output pin 3 coupled to pin 2 of circuit 840 over connection 852 that includes a series resistor 854, and has input pins 2 and 6 jointly connected through an input resistor 856 to connection 64b from sensing circuit 60 (corresponding to connection 52b of circuit 50). Diodes 858 and 860, corresponding to diodes 832 and 834 described above, apply signals from switches S3 and S1 to input pins 2 and 6 of circuit 850 through coupling capacitor 862.

Hold initiate transistor network 806 includes Darlington paired transistors 864 having the emitter output joined to connection 86 that extends to hold timer network 542 of sensing circuit 50. The collectors of transistors 864 are connected to +Vcc. Transistors 864 are operated between their conducting and nonconducting states by a signal from hold select switch S3 applied through an RC delay network of a 10 K ohm resistor 872 and a 10 microfarad capacitor 870 joined to the input base of Darlington transistors 864. When hold select switch S3 is depressed, Darlington transistors 864 conduct causing connection 86 to swing up to +Vcc and thereby energize coil 29a in sensing circuit 50, assuming coil 29a has been enabled by network 544.

Hold initiate transistor network 808 is identical to network 806 and thus includes Darlington paired transistors 874, an RC network including resistor 882 and a capacitor 880. When S3 is depressed, Darlington transistors 874 conduct causing connection 88 to swing to +Vcc for energizing the coil of an L2 hold relay corresponding to the above described hold relay 29 for line L1.

HOLD FLASH GENERATOR

Generator 90 is a conventional free-running multivibrator connected between +Vcc and ground and having a square wave output signal swinging between +Vcc and ground at the rate of approximately 0.50 Hz to produce a 30 impulse per minute hold indicating signal. The output of multivibrator 90 is extended over output connections 94 and 96 to the electro-optical isolators of line interface circuits 30 and 40 as described above with respect to connection 94 and isolator 334 for L1 line interface circuit 30.

OPERATION OF KTS

The operation of KTS 11 is best described by separately considering the following operating modes: initiating an outgoing call at one of stations #1-N; receiving an incoming call at one of the stations; ending a call; holding a call; and establishing a three-point conference call.

INITIATING AN OUTGOING CALL

Assuming that a call is to be placed at station #1 using telephone set 13 (FIG. 1), it will be observed that lines L1 and L2 are both in an on-hook condition and the telephone set 13 is disconnected from lines L1 and L2 by control unit 14. The telephone sets at stations #2-N are also disconnected from lines L1 and L2 by their associated control units.

The person using set 13 now depresses either S1 or S2 to connect set 13 to line L1 or L2, respectively. Assuming that line 1 is selected, then S1 will be depressed causing circuit 810 (FIG. 3) to deenergize the L1 line relay 24 and thereby cause contacts 24b, 24c to connect set 13 to the T' and R' output leads from control unit 14. The internal impedance of set 13 immediately causes the central office voltage on line 1 to drop from an on-hook voltage of from 48 to 96 volts dc depending upon the type of central office, to a lower off-hook voltage of from 3 to 20 volts dc. Within line interface circuit 30, network 306 including zener diode 316 immediately senses the drop in voltage on L1 and becomes nonconducting, turning Darlington transistors 314 off and causing output connection 38 to rise to +Vcc via optical isolator 320. The control signal bus 546 of sensing circuit 50 is now at or near +Vcc which results in the switching of the voltage at output pins 3 and 7 of timer circuit 548 to ground potential turning on indicator light IL1 and causing timer circuit 824 of line select circuit 80 to maintain pin 2 of timer circuit 810 at +Vcc. As a result circuit 810 becomes latched in a condition that maintains the coil 24a of L1 line relay 24 in a deenergized state which in turn maintains the connection of line L1 to telephone set 13 even though the contacts of S1 open as the S1 pushbutton is released.

Concurrently with the above-described operation of control unit 14, each of the other control units of stations #2-N respond to the off-hook condition on L1 and turn on their respective indicator lights IL1 in the same above-described manner that line interface circuit 30 and sensing circuit 50 of unit 14 responded to the off-hook voltage on line L1. The illumination of IL1 at each of the control stations informs telephone users at these stations that line L1 is busy.

Another related operating sequence occurs when the person at station #1 has just completed a call over L2 and wishes to place another call over L. In such case unit 14 automatically operates to disconnect L2 from set 13 when S1 is depressed. The momentary closure of the contacts of S1 cause a positive voltage spike to be applied to pins 2 and 6 of timer circuit 850 of line select circuit 80 via diode 860 and capacitor 862. Responsively, circuit 850, which is part of network 804 that controls the L2 line relay 26, goes to ground potential, causing pin 2 of integrated circuit 840 to also go to ground potential. Pin 6 of circuit 840 is already at ground potential, since any voltage previously applied to pin 6 and capacitor 848 by the momentary closure of the contacts of S2 has been discharged through resistor 846 to ground. Timer circuit 840 thus switches its output pin 3 from ground potential to +Vcc thereby deenergizing coil 26a of L2 line relay 26, disconnecting L2 from the station set. Thus, when either one of switches S1 or S2 is individually operated to select one of the available lines, the opposite line is automatically disconnected ("dumped"), unless the opposite line has been previously placed in a hold condition in the manner described hereinafter.

It is now assumed that telephone set 13 has been connected by control unit 14 to line L1 and a dial tone is received at set 13. The user now signals central office using either standard dialing or Touch-Tone (service mark of AT&T) signalling to reach the called party via the central office. The tone frequencies associated with Touch-Tone dialing do not have any appreciable effect on the operation of control circuit 14. Dial pulse signalling produces a series of high-going voltage pulses on L1, the peaks of which exceed approximately 36 volts dc. Line interface circuit 30 and sensing circuit 50 respond by producing a series of low going transitions on output connection 38 and on control signal bus 546. These low going pulse transistions do not register at indicator light IL1 because diode 554 of network 540 becomes reverse biased during the low going pulses on bus 546 and forces any change in the voltage at pin 2 of circuit 548 to be slowly discharged through the RC circuit of resistor 550 and capacitor 552. Thus, circuit 548 remains switched and indicator light IL1 remains continuously energized, discriminating against any response due to the pulse dialing sequence. Thereafter, central office 12 (FIG. 12) couples L1 to the called party's line to establish telephonic communication therebetween.

While a call is in progress over line 1 at station #1, the remaining stations #2-N are available for receiving an incoming call or initiating an outgoing call over L2 by operating L2 select switch S2 of the control unit at the associated station.

RECEIVING AN INCOMING CALL

The ringing signal of an incoming call that appears on lines L1 or L2 is coupled by control unit 14 to telephone set 13 by means of bell transfer relay 28. As shown in FIG. 3, contacts 28b and 28c of the bell transfer relay are normally closed to connect the T and R conductors of L1 to B1 and B2 that are in turn joined to the bell or other audible signalling device of the telephone set. Thus, the ringing signal of a call coming in on line L1 will be immediately applied to the bell of telephone set 13 without requiring any responsive change of the circuitry or relays in control unit 14. Similarly, the telephone sets associated with each of the other stations #2-N will sound the ringing signal through the normally closed bell transfer relay contacts of their respective control units.

Additionally, the ringing signal is applied to input terminals 302 and 304 of line interface network 30. Although the ringing signal may vary somewhat in voltage and frequency, it is typically a 90 volt peak-to-peak ac signal at 20 or 30 Hz superimposed on the on-hook dc voltage, typically 48 volts, developed at central office and appearing on the line during an on-hook condition. Thus, the ringing signal causes the T conductor of line L1 to swing between approximately +138 volts and −42 volts relative to the R conductor. A burst of these ac cycles will be spaced in time by intervals of silence during which the voltage on line L1 returns to the 48 volt dc level representing an on-hook condition. The superimposed ac signal is rectified by diode 310 and the resulting positive voltage swings, varying from zero volts to +138 volts are applied across network 306 including zener diode 316.

Zener diode 316 is thus periodically switched off as the voltage drops below the breakdown voltage of diode 316. Darlington transistors 314 and electro-optical isolator 320 are thus similarly, periodically switched off, causing the voltage on output connection 38 to fluctuate between ground potential and +Vcc at the pulsating rate of the ac ringing signal.

Sensing circuit 50 and in particular, network 540 thereof, receives the pulsating signal from bus 546 and detects each burst of ac ringing to turn on IL1 for the duration of each such burst. This is accomplished by setting the time constant of the RC network of resistor 550 and capacitor 552 to hold the charge on capacitor 552 so that pins 2 and 6 of timer circuit 548 are maintained above ⅓ +Vcc for the duration of each burst of closely spaced positive voltage swings on bus 546, with capacitor 552 discharging slowly through resistor 550 at the end of each burst. In this way indicator light IL1 is maintained on for the duration of each burst. The interviewing silent intervals between ringing signal bursts are long enough to allow capacitor 552 to discharge and thereby force timer circuit 548 to turn IL1 off. Indicator light IL1 thus flashes a visual signal to alert the user at the station of a ringing signal representing an incoming call, and can be used by itself or in conjunction with the audible ringing signal device of the telephone set.

The ringing signal of an incoming call that arrives on line L2 does not immediately reach B1 and B2 because of the intervening, normally open contacts 28d and 28e of relay 28. Rather, the ringing signal is applied to the T and R inputs of line interface circuit 40 for line L2, corresponding to the input terminals 302 and 304 of line interface circuit 30 for line 1, and circuit 40 in conjunction with sensing circuit 60 responds to the ringing signal and causes bell transfer circuit 70 to close contacts 28d and 28e and open contacts 28b and 28c. The ringing signal on L2 is thereby transfered to the B1 and B2 outputs for sounding the bell of set 13.

In particular, circuit 40 responds to the ringing signal, as described above for L1 line interface circuit 30, to produce a fluctuating signal on output connection 42 in synchronization with the burst of ac ringing.

The fluctuating signal on connection 42 due to the ringing signal bursts has two functions. First, the pulsating signal is applied via bus 646 (corresponding to bus 546 of circuit 50) and hence to input 71 of bell transfer circuit 70 such that each positive voltage swing at input terminal 71 is coupled through capacitor 782 and forward biased diode 783 to capacitor 785, charging the capacitor and causing the voltage thereacross to rise toward +Vcc. Pins 2 and 6 of timer circuit 786 thus receive +Vcc, causing output pin 7 to be clamped to ground potential and causing the energization of bell transfer relay coil 28a. Energization of coil 28a causes the above mentioned opening of contacts 28b and 28c and the correlative closing of contacts 28d and 28e, so as to apply the ringing signal on L2 to B1, B2 shortly after the ringing signal is received at control unit 14. The time constant of the RC network formed by resistor 784 and capacitor 785 is long enough to hold the voltage charge on capacitor 785 resulting from the positive pulses developed by line interface circuit 40 on output connection 42 for spanning the interval of silence between bursts of ac ringing. Pins 2 and 6 of circuit 786 thus remain at a level greater than ⅓ +Vcc during the silent intervals between rings thereby maintaining coil 28a energized. At approximately 3 seconds after the last burst of ac ringing voltage, capacitor 785 is discharged to drop the potential at pins 2 and 6 of circuit 786 below the ⅓ +Vcc switching threshold of the circuit, allowing pin 7 to assume an open circuit and thereby deenergize coil 28a and restore contacts 28d-3 to their conditions as shown in FIG. 3.

Secondly, the fluctuating positive going signal on connection 42 from line interface circuit 40 is effective via circuit 60 to turn indicator light IL2 on during each burst of the ac ringing signal. IL2 is energized through a resistor 656 that serially connects IL2 to output connection 64a of circuit 60 (corresponding to connection 52a of circuit 50) which in turn is joined to the timer circuit corresponding to circuit 548 of network 540 of the above-described L1 sensing circuit 50. The functioning of sensing circuit 60 in this respect is identical to the above-described operation of sensing circuit 50.

It is noted that the contacts of the bell transfer relay 28 are arranged so that line L1 is normally connected to B1, B2 of the station's set and will remain so connected in the event of a power failure in the supply voltage for control unit 14. With the above described arrangement of L1 line relay 24 in which the normally closed contacts 24b, 24c automatically connect line L1 to the T' and R' terminals of the station's telephone set, and in the event of a power failure, a fully operable telephone line and set is ensured at each of the available stations.

ENDING A CALL

Assuming that a call over line L1 at station 1 has been completed and the handset of telephone set 13 is returned to its cradle, this action disconnects the internal impedance of the phone set from L1 causing L1 to assume an on-hook condition. The voltage on the tip and ring conductors of L1 rises to the on-hook voltage of 48 to 96 volts dc depending upon the type of central office and as a consequence zener diode 316 begins conducting. Network 306 including Darlington transistors 314 and photo-optical isolator 320 are turned on to clamp connection 38 to ground potential. The signal bus 546 swings low to ground potential and after a 150 millisecond delay caused by the RC network 550 and capacitor 522, output pin 7 of timer circuit 548 assumes an open circuit extinguishing indicator light IL1.

At the same time, output pin 3 of integrated circuit 548 swings to +Vcc causing pin 3 of circuit 824 of line select circuit 80 to be switched to ground potential, thereby cancelling the latching signal theretofore applied to input pin 2 of timer circuit 810. Circuit 810 now energizes line relay coil 24a to disconnect L1 from T', R'. The call has been completed and the telephone line has been disconnected from the station's set, and control unit 14 is restored to an idle condition. The idle or on-hook condition is indicated by the fact that IL1 is off.

To end a call established over line L2, line interface circuit 40 and sensing circuit 60 function in the same manner described above for circuits 30 and 50 to cause L2 line relay 26 to disconnect the T' and R' conductors from the T and R conductors of L2 and return unit 14 to an idle condition.

Telephone calls are also ended automatically when a person at any particular station depresses the line select switch of the opposite line from that on which a call is in progress. This feature is described in detail above under the section dealing with the initiation of an outgoing call.

HOLDING A CALL

When a call is in progress over L1 or L2 and the station's set is connected to the applicable line, then that line may be placed in a hold condition in accordance with the following operation. To illustrate this operation, it will be assumed that a call is in progress over L1 at station #1 and thus telephone set 13 is connected to the tip and ring conductors of L1 through line relay contacts 24b and 24c. Now the party at station #1 wishes to place the call on L1 in a hold condition so as to enable the telephone set 13 to be disconnected from L1 (so as, for example, to answer an incoming call on L2) while still maintaining the telephonic connection of line L1 through the central office to the remote party on L2.

To accomplish this, the hold select switch S3 is depressed. This applies a positive voltage spike to pins 2 and 6 of timer circuit 824 of line select circuit 80 thereby overriding the latching voltage applied to pin 2 of timer circuit 810 and causing L1 line relay 24 to be energized. Contacts 24b and 24c open and thus disconnect T' and R' from line L1.

Concurrently therewith, the closure of the S3 contacts applies a positive voltage to the base of Darlington transistors 864 of hold initiate transistor network 806 which in turn energizes hold relay coil 29a of hold relay 29.

At this time, hold enable network 544 of sensing circuit 50 has been preconditioned by the initial operation of L1 select switch S1 (when the telephone call over line 1 was first established) so that the output pin 7 of timer circuit 572 is at ground potential enabling the energization of relay coil 29a over connection 570. The enabling signal applied to the lower end of hold relay coil 29a over connection 570 insures that only the party at the particular station that received or made the call can place L1 in a hold status.

Coil 29a is now energized and remains energized for a delay interval established by the RC network of resistor 872 and capacitor 870 of network 806 even after the contacts of S3 open following the release of S3. The hold relay contacts 29b within line interface circuit 30 are now closed, connecting network 308 of circuit 30 across the tip and ring conductors of L1.

Zener diodes 330 and 332 of line interface circuit 30 are now connected across L1 to limit the maximum voltage that can appear across the tip and ring conductors of L1 to 19.7 volts, which is the sum of the combined breakdown voltages of zener diodes 330 and 332. From this maximum, the voltage across L1 drops to 4.7 volts each timer zener diode 330 is shunted by the photo-optical isolator 334 in response to hold flash generator 90. The change in voltage level across L1 between the maximum of 19.7 volts and the minimum of 4.7 volts at the 30 impulses per minute rate of generator 90 creates the hold indicating signal that is issued over L1 to the control units at the other stations of the KTS. Moreover, the maximum voltage allowed to exist across line L1 during the hold status is 19.7 volts, which is a low enough voltage to simulate the presence of a line terminating impedance that is equivalent to the internal impedance of a telephone set when off-hook and that enables an adequate minimal loop current to flow in the line to hold the central office connection to the remote party. Thus, so long as the voltage across L1 is maintained at or below the 19.7 volts established by the zener diodes 330 and 322, central office continues to sense an off-hook condition at L1.

As mentioned above, the breakdown voltage of zener diode 316 is selected to lie within the range of 15–20 volts in order to detect the voltage change on the line between an on-hook condition and an off-hook condition. In addition to this constraint, the breakdown voltage of zener diode 316 is selected to lie below the combined voltages of zener diodes 330 and 332 and above the voltage due solely to diode 332, so that diode 316 is switched between its conducting and nonconducting states each time the voltage on line L1 swings between the maximum of 19.7 volts and the minimum of 4.7 volts at the rate of flash generator 90.

Line interface circuit 30 responds to the fluctuating hold indicating signal on L1 and causes the voltage on connection 38 to fluctuate between ground potential and +Vcc as the zener diode 316 is switched between its conducting and nonconducting states. The control signal bus 546 of sensing circuit 50 receives this fluctuating hold indicating signal and applies it to networks 540, 542 and 544.

In network 540 the RC network of resistor 550 and capacitor 552 are selected to provide a short enough delay to enable timer circuit 548 to respond to the hold indicating signal on bus 546 and thereby cause indicator light IL1 to flash on and off at approximately the rate of generator 90.

In network 542, the associated RC components are selected such that timer circuit 560 does not respond to the fluctuating signal on control bus 546. In particular, capacitor 564 is charged slowly through resistor 562 when bus 546 swings high toward +Vcc and is quickly discharged through diode 566 when the bus swings low to ground potential. The time constant of resistor 562 and capacitor 564 is such that the frequency of the hold indicating signal is too rapid to allow the voltage on pins 2 and 6 of timer circuit 560 to rise to the ⅔ +Vcc threshold switching level of circuit 560 and thus pin 3 of circuit 560 is maintained high at +Vcc during the presence of the hold indicating signal on line L1. With pin 3 of circuit 560 at +Vcc, coil 29a of hold relay 29 is latched in the energized state through the normally open hold relay contacts 29c. When thus latched, the hold relay 29 maintains the line interface circuit 30 and sensing circuit 50 in the hold condition, so as to continuously generate and apply the hold indicating signal to L1 and maintain the simulated line terminating impedance across L. Similarly, in network 544 the nonlinear RC network of resistor 588, capacitor 590 and diode 582 provide a time constant when diode 582 is reverse biased that maintains pin 2 of timer circuit 527 high throughout the hold condition even though bus 546 periodically swings low.

The hold indicating signal on L1 is received at each of the control units, causing their respective line interface and sensing circuits, corresponding to circuits 30 and 50 to pulse the associated indicator light, corresponding to light IL1, on and off in synchronization with the hold indicating signal. A visual signal is thereby received at each station indicating that the line is in a hold condition. Note that only the hold relay 29 associated with the line and station at which a call has been made or received will be operated and held energized by the timer network 542 because of the required enabling signal from network 544 as described above.

The time constant of resistor 562 and capacitor 564 of network 542 is sufficiently long so that circuit 560 does not switch in response to dial pulses which might otherwise enable the latching of the hold relay 29 by an inadvertent operation of hold switch S3 during dialing.

Additionally, the hold enable signal from network 544 over connection 570 prevents the inadvertent operation of the hold relay under the following circumstances. When line L1 is picked up by operating L1 select switch S1, the hold relay 29 associated with line L1 is enabled by network 544 as above described. Now assume that while the party at the station is talking over L1, a call comes in over L2. Intending to hole L1 while L2 is answered, the person at the station depresses hold select switch S3. Because of the presence of the incoming ringing signal concurrently on line L2 when S3 is depressed, there is the possibility (in the absence of a hold enable network such as network 544) that the fluctuating signal condition on bus 646 of sensing circuit 60 will cause the hold timer of sensing circuit 60 to latch the associated hold relay and thereby inadvertently place L2 in a hold mode. The hold enable network 544 in each of the sensing circuits prevents this occurrence by enabling only the hold latching network or networks associated with the line or lines that have been selected by the select switches S1 and S2 at the subject station.

During operation of the hold control, zener diodes 330 and 322 maintain a certain minimum current flow through the loop associated with line L1 and it is that current flow that the central office senses in determining whether the station is on-hook or off-hook. The minimum current flow will be established by the source voltage at the central office, less the breakdown voltages of the zener diodes 330 and 332, divided by the loop impedance which includes the line resistance. So long as the loop current flow in the line remains greater than approximately 20 milliamperes, it usually varies within the range of 20 to 65 milliamperes after seizure of the line at central office, then the central office will sense on off-hook condition and will remain seized on the line. There is a certain initial threshold current level (in excess of the minimum sustaining current) required to cause the central office to switch from an unseized to a seized state, however, once the line has been seized, it will continue to hold it so long the minimum sustaining current is maintained. For most all central offices and most all operating conditions, a minimum substaining current of 20 milliamps is sufficient. Under certain "best case" conditions as little as 13 milliamps may be adequate.

Figure 4:
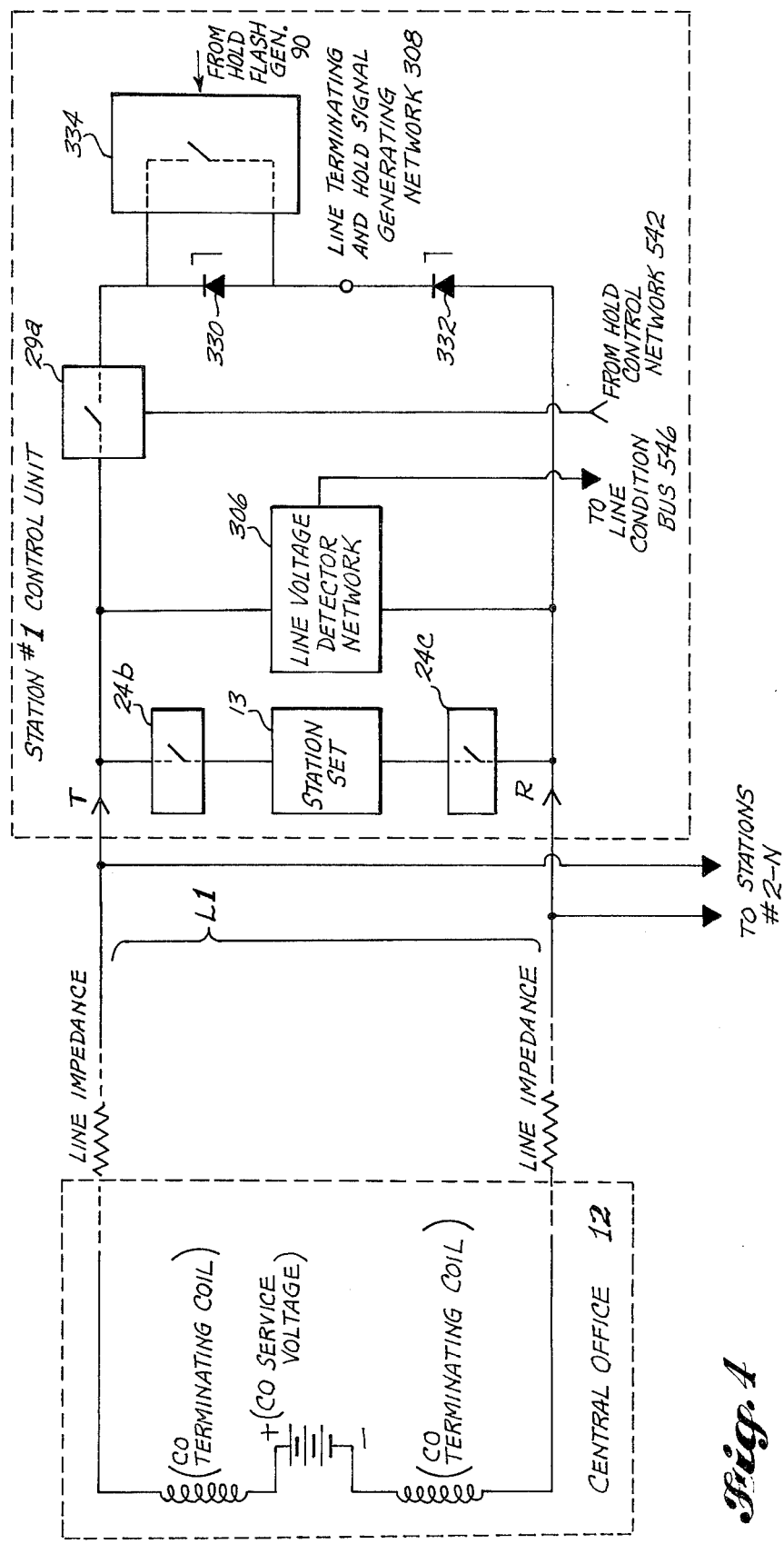
FIG. 4 is a simplified block and schematic diagram of the line terminating impedance and hold signal generator of the invention in circuit with a telephone line from a central office.

With reference to FIG. 4, it is thus seen that in accordance with the invention, zener diodes 330 and 332 provide, in the broad sense, first and second impedance elements which are connected across line L1 and serve the dual functions of (1) simulating the internal impedance of the telephone set when off-hook or otherwise disconnected from the line, and (2) generating and applying a fluctuating hold indicating signal across the line (in conjunction with the periodic shunting of at least one of these impedance elements by optical isolator 334). Although resistive or other impedance elements can be used in lieu of zener diodes 330 and 332 to provide the above-mentioned dual functions, the zener diodes are preferred because of their ability to compensate for large variations in the loop impedance of the telephone line. In particular, this loop impedance varies, for example, with the distance of the customers installation from the central office and with the type and size of conductors used in the telephone line. If ordinary impedance elements are used for one of both of the zener diodes 330 and 322, it is necessary to uniquely select or adjust the values of such elements relative to the line impedance for each installation. In contrast, the zener diodes, because of the nature of their special breakdown voltage verses current characteristics, automatically adjust the current and voltage levels for proper operation of the voltage level detecting function of network 306. Such automatic adjustment or compensation has proved successful for most all installations, embracing a wide range of distances from the central office and thus wide range of line impedance levels. The amplitude of the fluctuations of the hold indicating signal which appear on the line do not affect the switching functions at the central office since the fluctuating signal is terminated into a large inductive coil at the central office end of the line and since the inherent distributed resistance, capacitance and inductance of the line significantly attenuate the fluctuating hold indicating signal before it reaches the central office equipment.

Also, the periodic shunting of zener diode 330 serves in the broad sense as a means for varying the magnitude of the terminating impedance, and thus while the short circuit shunting of diode 330 has been found to provide sharply defined and easily detected voltage fluctuations it will be recognized that other impedance varying means may be used.

To place L2 in a hold condition, line interface circuit 40, sensing circuit 60 and hold initiating transistor network 808 of line select circuit 80 function in an identical manner so that described above for line L1 to cause a hold indicating signal to be generated and applied to line L2 at the output signal rate of hold flash generator 90. In this instance, indicator light IL2 and its counterparts in the control units associated with stations #2-N will display the on/off hold indicating signal to indicate that line L2 rather than line L1 is on hold.

The hold condition existing on either of the lines is terminated by the same procedure that is described above for initiating an outgoing call or receiving an incoming call. Thus, to terminate a hold condition on line L1, the handset of the telephone at any of the available stations is lifted off the cradle and L1 select switch S1 is depressed. The line relay 24 hereupon operates to connect L1 to the T' and R' terminals of the telephone set 13 thereby connecting the internal impedance of the telephone set across line L1 and forcing the dc voltage on L1 to assume the off-hook level which lies below the breakdown voltage of zener diode 316. In other words, the internal impedance of the telephone set is such as the mask the maximum voltage produced by zener diodes 330 and 332, thereby preventing the voltage from reaching the breakdown threshold of zener diode 316.

Connection 38 and signal bus 546 thereupon assume a steady +Vcc voltage level. The disappearance of the low-going fluctuations on bus 546 allows capacitor 564 of hold latching network 542 to accumulate a steady positive charge that raises the voltage at pins 2 and 6 of timer circuit 560 to its switching threshold, forcing output pin 3 to go low to ground potential and thereby deenergizing hold relay coil 29a. Contacts 29c of the hold relay open and thus unlatch the hold relay terminating the hold mode and allowing circuit 810 of line select switching network 802 to latch line relay 24 in a condition that maintains L1 connected to the station's set.

ESTABLISHING A CONFERENCE CALL

Many times it will be desirable to join both lines L1 and L2 to the station set 13 in order to permit a conference call between the party at the station and two remote parties connected separately over lines L1 and L2. Usually, the conference call will be established after a call between the station and a remote party has been effected over one of the lines and that line is placed in a hold condition in order to receive or place a second call over the opposite line.

Taking each of these examples in succession, first assume that a call is in progress over L1 and control unit 14 of FIG. 3 has connected L1 to the station's telephone set 13. Now a ringing signal appears on L2 representing an incoming call. The party at station #1 tells the remote party on L1 that he is going to place the latter on hold which he does by depressing hold select switch S3. Line L1 is thereby released from the T' and R' output conductors of unit 14 by the opening of line relay contacts 24b and 24c. Set 13 is thus available for connection to L2 and the party at station #1 accomplishes this by depressing line select switch S2. The control unit responds by energizing relay 26 and thus closing 26b and 26c coupling the telephone set to L2 and the party at station #1 answers the caller on L2 who is to be the third party to the three-point conference.

Now with L1 on hold and L2 connected to the station's set, the conference call is established by simultaneously depressing both line select switches S1 an S2. The closure of the S1 contacts applies +Vcc to both pins 2 and 6 of circuit 810 of network 802 forcing pin 3 of circuit 810 to deenergize the line relay 24 and connect L1 through contacts 24b and 24c to the station's set. L2 is already connected to the station's set through the contacts 24b and 24c which have been previously closed by circuit 840 and continue to remain closed when line select switch S2 applies +Vcc to both input pins 2 and 6 of circuit 840.

By simultaneously depressing S1 and S2, the automatic dumping of the opposite telephone line through the cross coupled circuits formed by serially connected diode 860 and capacitor 862 and serially connected diode 834 and capacitor 830 is negated by the overriding, positive voltages applied to the input pins of circuits 810 and 840 from the simultaneously closed contacts of S1 and S2. For example, when S1 is depressed, a positive voltage spike is applied to circuit 850 via diode 860 and capacitor 862 which tries to force input pin 2 of circuit 840 to go to ground potential via resistor 854. However, at the same time S2 overrides the low going output of circuit 850 and maintains input pin 2 at +Vcc to hold circuit 840 in a state that continues to energize L2 line relay 26.

Similarly, the low going signal normally applied to input pin 2 of circuit 810 through resistor 826 when S2 is depressed is overridden by the direct application of +Vcc to input pin 2 by the simultaneous closure of the S1 contacts.

Both lines L1 and L2 are thereby jointly connected to the telephone set and will remain so until the three-point conference call has been completed and one or both of lines L1 and L2 are to be disconnected.

At the end of the conference call, if both callers are to be disconnected, then the party at station #1 simply hangs up station's set 13. Both lines L1 and L2 assume their respective on-hook conditions and force the circuitry of control unit 14 to switch line relays 24 and 26 so as to restore the system to an idle state.

If only one of the remote callers is to be disconnected, then the party at station #1 simply presses the opposite line select switch. Thus, if the conference caller on L1 is to be disconnected and the call on L2 is to be continued, then line select switch S2 is depressed thereby automatically dumping line L1 in the manner described above under the section on terminating a call.

It is also possible to place both of the remote parties on hold in order to split the calls for talking to the remote parties individually, or allowing another station to talk to one of the remote callers while station #1 resumes its conversation with the remaining remote party. When hold select switch S3 is depressed, the above described hold control circuitry associated with both L1 and L2 is activated placing both lines L1 and L2 in a hold status. Now any one of stations #1-N may pick up one of the lines by depressing the appropriate select switch to connect the associated telephone set to the selected line. The other line remains on hold and may be picked up at another station.

INSTALLATION OF KTS 11

In installing KTS 11 at a particular location, consideration should be given to the relationship between the ability of line interface circuit 30 to discern between on-hook and off-hook signal conditions and the type of central office involved and distance of the KTS stations from the central office. For central offices that require approximately 45 milliamperes of initial current flow to seize a line in response to an off-hook condition at the customer station, reliable operation of KTS 11 has been achieved for line distances of up to 1 mile from the central office. For central offices that need only 36 milliamperes of initial current flow to seize a line when it goes off-hook, then the system has operated reliably at distances of as much as 1 to 2 miles.

Futhermore, the capability of the various control units to reliably detect a fluctuating hold indicating signal generated by a control unit at another station (and to consistently supress such signal when the telephone set is taken off-hook at another station) depends, among other factors, on the line distance or distances between stations, and on the line distances from such stations to the central office. In particular, for a KTS 11 installation that is at a relatively long distance from the central office such that the control units are separated from the central office voltage source by a substantial amount of loop impedance, then the fluctuating hold signal can be consistently detected (and consistently supressed by the off-hook impedance of a telephone set) over interstation distances of more than one mile.

When, however, KTS 11 is installed relatively close to the central office, then there is a lesser amount of loop impedance between the central office voltage source and the control units. Consequently, the interstation distance over which the fluctuating signal can be reliably detected (and supressed) is diminished because of the greater influence of the central office source voltage on the varying line voltage at the control units, and the limits of the permissible interstation distance, for reliable operation, are reduced in proportion to the proximity of the installation to the central office. For example, with the embodiment disclosed herein, at an installation distance of 1000 feet or less from the central office, the interstation separation should be limited to amaximum of one mile.

Although the above installation considerations are stated with respect to line distances, it will be recognized that there are other variables, including wire size and type, which to a lesser extent affect the loop impedance and thus will alter somewhat the permissible interstation distances.

While only a limited number of embodiments of the present invention have been disclosed, it will be readily apparent to persons skilled in the art that numerous changes and modifications may be made to these embodiments without departing from the spirit of the invention. For example, the particular circuitry used for sensing the hold condition signal (e.g., sensing circuits 50 and 60 of unit 14) and for selecting the lines (line select circuit 80 of unit 14) can be modified in various ways, such as by using primarily digital logic circuitry for these functions rather than the disclosed analog type of circuits. Nevertheless, the basic principles of the hold control circuitry which cooperates with the sensing and line select circuits through the line interface circuit, will remain the same.

The embodiments of the invention in which an exclusive property or privilege is claimed are defined as follows:

1. A hold control circuit for a telephone system of the type that includes a telephone line extending to a telephone set which has an internal line terminating impedance, and which produces a signal on such line that signals an off-hook condition by connecting said internal line terminating impedance across the line when the telephone set is off-hook, and which produces a signal on such line that signals an on-hook condition by disconnecting said internal line terminating impedance from across the line when said telephone set is on-hook, said circuit comprising:

hold condition line terminating impedance means that when connected across said line simulates an off-hook condition on said line even though the internal line terminating impedance of the telephone set is disconnected from the line;

means for connecting said hold condition line terminating impedance means across the line;

means for varying said hold condition line terminating impedance means to cause a varying voltage signal to appear on the line signalling that the line is in a hold condition;

means for sensing said varying voltage signal; and means responsive to said means for sensing for indicating that the line is in said hold condition.

2. The hold control circuit of claim 1, wherein said hold condition line terminating impedance means comprises at least one device having voltage versus current breakdown characteristics.

3. The hold control circuit of claim 1, wherein said hold condition line terminating impedance means comprises first and second serially connected impedance elements and said means for varying said hold condition line terminating impedance means comprises means for periodically shunting one of said first and second impedance elements.

4. The hold control circuit of claim 3, wherein at least one of said first and second impedance elements is a device having voltage versus current breakdown characteristics.

5. The hold control circuit of claim 3, wherein said first and second impedance elements are semiconductors having avalanche-breakdown characteristics.

6. The hold control circuit of claim 1, wherein said hold condition line terminating impedance means comprises first and second serially connected semiconductors, each having avalanche-breakdown voltage versus current characteristics, and said means for varying said impedance comprises switching means connected in shunt about one of said semiconductors for periodically short circuiting such semiconductor.

7. The hold control circuit of claim 1, wherein said line terminating impedance means includes means for alternately providing a first predetermined impedance and a second predetermined impedance different from said first predetermined impedance, and said means for varying said line terminating impedance means includes means for periodically changing said line terminating impedance means between said first predetermined impedance and said second predetermined impedance.

8. The hold control circuit of claim 7, wherein said telephone line assumes a predetermined on-hook voltage when the telephone set is on-hook and assumes a predetermined off-hook voltage when the telephone set is off-hook and wherein said first predetermined impedance is selected to cause a predetermined maximum holding voltage of said varying voltage signal that is less than said on-hook voltage and wherein said second predetermined impedance is selected to cause a predetermined minimum holding voltage of said varying voltage signal that is less than said maximum holding voltage.

9. A hold condition indicating circuit for a telephone system of the type that includes a telephone line extending to a telephone set, and that produces a signal on such line indicating an off-hook condition of said telephone set by connecting a line terminating impedance across the line when said telephone set is off-hook, and that produces a signal on such line indicating an on-hook condition by disconnecting said line terminating impedance from across the line when said telephone set is on-hook, said circuit comprising:

a hold condition impedance means that when connected across said line terminates said line so as to simulate an off-hook condition on said line even though the telephone set is on-hook, said hold condition impedance means comprising first and second serially connected impedance elements;

a hold condition signal generator means for selectively producing a hold indicating signal that when applied to the line indicates that the line is in a hold condition, said hold condition signal generator means comprising means for periodically shunting one of said first and second impedance elements to produce said hold indicating signal;

a hold condition switching means having first and second states, said hold condition switching means normally assuming said first state and being switchable to said second state in which it connects said hold condition impedance means across the line and causes said hold condition signal generator means to apply said hold indicating signal to the line, said hold condition switching means when in its first state disconnecting said hold condition impedance means from across the line and thus causing said hold condition signal generator means to remove said hold indicating signal from the line;

manually actuable means for causing said hold condition switching means to switch from its first state to its second state; and means for automatically causing said hold condition switching means to revert to its first state when the line terminating impedance of a telephone set is connected across the line.

10. The hold condition indicating circuit of claim 9, wherein at least one of said first and second impedance elements is a semiconductor having avalanche-breakdown, voltage versus current characteristics.

11. The hold condition indicating circuit of claim 9, wherein both said first and second impedance elements are semiconductors having avalanche-breakdown, voltage versus current characteristics.

12. In a key telephone system for use with at least first and second telephone lines extending to at least first and second telephone stations, in which each station has an associated telephone set and a control unit that includes first and second switching means for separately connecting a selected one of the first and second lines, respectively, to the telephone set at the associated station for establishing telephonic communication over the selected line, the combination therewith of first and second hold control means in at least one of the control units for separately placing a selected one of the first and second lines that has been previously connected to the telephone set at the associated station in a hold condition, each of said first and second hold control means comprising:

a hold condition switching means, a line terminating impedance means, a hold condition signal generator means, a line condition sensing means and a line condition indicating means;

said hold condition switching means of said first hold control means coupling said line terminating impedance means and said hold condition signal generator means of said first hold control means to the first line when the first line is to be placed in a hold condition, and said hold condition switching means of said second hold control means coupling said line terminating impedance means and said hold condition signal generator means of said second hold control means to the second line when the second line is to be placed in a hold condition, said line terminating impedance means of said first and second hold control means when coupled to the first and second lines, respectively, maintaining the respective line in a hold condition, and each of said hold condition signal generator means of said first and second hold control means when coupled to said first and second lines, respectively, producing a hold condition indicating signal on the respective line; and said line condition sensing means of said first hold control means sensing the presence of a hold condition indicating signal on the first line, and said line condition sensing means of said second hold control means sensing the presence of a hold condition indicating signal on the second line, each of said line condition indicating means of said first and second hold control means being separately responsive to said line condition sensing means of said first and second hold control means, respectively, so that the presence of said hold condition indicating signal on either or both of said first and second lines are indicated.

13. The key telephone system of claim 12, wherein each of said line terminating impedance means of said first and second hold control means comprises at least a first impedance element that has an impedance such that when connected across the associated one of said lines causes a predetermined minimum loop current to flow in the telephone line that is sufficient to maintain a pre-established telephonic communication thereover, and wherein each of said hold condition signal generator means comprises means for periodically shunting said first impedance element of the associated said line terminating impedance means to cause a fluctuating voltage to be developed across the associated one of said lines for representing said hold condition indicating signal, and wherein said first and second line condition sensing means each including means for detecting said fluctuating voltage on the associated one of said first and second lines.

14. The key telephone system of claim 13, wherein said first impedance element of each of said line terminating impedance means comprises a device having voltage versus current breakdown characteristics.

15. The key telephone system of claim 13, wherein each of said line terminating impedance means further comprises a second impedance element serially connected with said first impedance element, and said means for periodically shunting said first impedance element includes means for periodically causing a short circuit shunt around said first impedance element such that said fluctuating voltage swings between a maximum voltage equal to the sum of the individual voltages across said first and second impedance elements and a minimum voltage due solely to the voltage across said second impedance element.

16. The key telephone system of claim 15, wherein said first impedance element of each of said line terminating impedance means comprises a semiconductor device having avalanche-breakdown, voltage versus current characteristics.

17. The key telephone system of claim 16, wherein said second impedance element of each of said line terminating impedance means comprises a semiconductor device having avalanche-breakdown, voltage versus current characteristics.

18. The key telephone system of claim 12, wherein each of said hold condition signal generator means include means for producing a hold condition indicating signal that fluctuates between a predetermined maximum voltage and a predetermined minimum voltage, and wherein said line condition sensing means of each of said first and second hold control means includes means for detecting whether the voltage on the associated one of said first and second lines is above or below a predetermined threshold voltage, said predetermined threshold voltage being selected to lie between said predetermined maximum and minimum voltages of the fluctuating hold condition indicating signal.

19. The key telephone system of claim 18, wherein each of said first and second telephone lines assumes a predetermined on-hook voltage when a telephone set that is connected to the line is on-hook and wherein each of said first and second telephone lines assumes a predetermined off-hook voltage when a telephone set that is connected to the line is off-hook, said predetermined maximum voltage being less than said on-hook voltage and said predetermined threshold voltage being greater than said off-hook voltage, and said first and second hold control means each further comprising means for causing their respective hold condition switching means to decouple said line terminating impedance means and said hold condition signal generator means from said lines when such lines assume said off-hook voltages.

20. A hold condition indicating circuit for each of a plurality of telephone sets in a telephone system of the type that includes a telephone line extending parallel to said plurality of telephone sets, and on which a signal is produced for indicating an off-hook condition at one or more of said telephone sets by connecting a line terminating impedance of one or more of said telephone sets across the line when the associated said telephone set is off-hook, and on which a signal is produced for indicating an on-hook condition by disconnecting all line terminating impedances from across the line when all of said telephone sets are on-hook, each said circuit comprising:

a hold impedance means that when connected across said line terminates said line so as to simulate an off-hook condition on said line even though the plurality of telephone sets are all on-hook;

a hold condition signal generator means for selectively producing a hold indicating signal that when applied to the line indicates that the line is in a hold condition;

a line condition sensing circuit means for detecting the presence of said hold indicating signal on said line;

indicator means responsive to said sensing circuit means for producing an indication at each of said plurality of telephone sets that said line is in a hold condition;

a hold condition switching means having first and second states, said hold condition switching means normally assuming said first state and being switchable to said second state in which it connects said hold condition impedance means across the line and causes said hold condition signal generator means to apply said hold indicating signal to the line, said hold condition switching means when in its first state disconnecting said hold condition impedance from across the line and causing said hold condition frequency signal generator means to remove said hold indicating signal from the line;

manually actuable means for causing said hold condition switch means to switch from its first state to its second state; and means for automatically causing said hold condition switching means to revert to its first state when the line terminating impedance of a telephone set is connected across the line.

21. The hold condition indicating circuit of claim 20, wherein said hold condition impedance means comprises at least one device having voltage versus current breakdown characteristics.

22. The hold condition indicating circuit of claim 20, wherein said hold condition signal generator means includes means for producing a hold indicating signal on said line that fluctuates between a predetermined maximum voltage and a predetermined minimum voltage, and wherein said line condition sensing circuit means includes means for detecting whether the voltage on said line is above or below a predetermined threshold voltage, said predetermined threshold voltage being selected to lie between said predetermined maximum and predetermined minimum voltages of the fluctuating hold indicating signal.

23. The hold condition indicating circuit of claim 22, wherein said telephone line assumes a predetermined on-hook voltage when all of said plurality of telephone sets are on-hook and wherein said telephone line assumes a predetermined off-hook voltage when one or more of said telephone sets is off-hook, said predetermined maximum voltage being less than said predetermined on-hook voltage and said predetermined threshold voltage being greater than said predetermined off-hook voltage, and said means for automatically causing said hold condition switching means to revert to its first state comprising means that is responsive to said predetermined off-hook voltage appearing on said line.

24. The hold condition indicating circuit of claim 22, wherein said means for producing the hold condition indicating signal that fluctuates between said predetermined maximum and predetermined minimum voltages comprises means for varying said hold condition impedance means between first and second impedance levels selected so that said first impedance level causes said hold indicating signal to assume said predetermined maximum voltage and so that said second impedance level causes said hold indicating signal to assume said predetermined minimum voltage.

* * * * *

UNITED STATES PATENT AND TRADEMARK OFFICE
CERTIFICATE OF CORRECTION

PATENT NO. : 4,132,860

DATED : January 2, 1979

INVENTOR(S) : Harry Rasmussen

It is certified that error appears in the above-identified patent and that said Letters Patent is hereby corrected as shown below:

Column 29, line 20, delete "frequency".

Signed and Sealed this

Sixteenth Day of July 1985

[SEAL]

Attest:

DONALD J. QUIGG

Attesting Officer   Acting Commissioner of Patents and Trademarks